US005623112A

United States Patent [19]

Ito et al.

[11] Patent Number: 5,623,112

[45] Date of Patent: Apr. 22, 1997

[54] AUTOMATIC PERFORMANCE DEVICE

[75] Inventors: Yoshihisa Ito; Tomoyuki Kumagai; Tadasu Kakizaki, all of Hamamatsu, Japan

[73] Assignee: Yamaha Corporation, Japan

[21] Appl. No.: 365,509

[22] Filed: Dec. 28, 1994

[30] Foreign Application Priority Data

Dec. 28, 1993 [JP] Japan .................................... 5-353286

[51] Int. Cl.$^6$ ................................ G01H 1/06; G01H 1/38

[52] U.S. Cl. ................................................ 84/622; 84/610

[58] Field of Search ............................ 84/602, 603, 604, 84/605, 606, 607, 609, 610, 611, 612, 613, 614, 622, 623

[56] References Cited

U.S. PATENT DOCUMENTS

| | | | |
|---|---|---|---|
| 4,674,383 | 6/1987 | Suzuki | 84/1.03 |
| 4,685,370 | 8/1987 | Okuda et al. | 84/1.03 |
| 5,260,509 | 11/1993 | Shimada et al. | 84/622 |
| 5,369,216 | 11/1994 | Miyamoto | 84/609 |
| 5,436,404 | 7/1995 | Shimada | 84/610 |

*Primary Examiner*—William M. Shoop. Jr.
*Assistant Examiner*—Marlon Fletcher
*Attorney, Agent, or Firm*—Graham & James LLP

[57] ABSTRACT

An automatic performance device has a phrase performance information memory storing pieces of phrase performance information having predetermined phrase lengths, which each have phrase-discriminating information imparted thereto. A performance pattern memory stores pieces of performance pattern information for determining a sequence of performance of the pieces of phrase performance information. A CPU prepares pieces of performance pattern information by storing the pieces of phrase-discriminating information into the performance pattern memory in a sequence of performance of the pieces of phrase performance information, according to operation by an operator, and imparts to the prepared pieces of performance pattern information as many pieces of pattern-discriminating information. Pieces of performance pattern information are designated by means of the pattern-discriminating information. Then, the CPU reads out pieces of phrase-discriminating information for phrases of the designated pieces of performance pattern information in the performance sequence from the performance pattern memory, and reads out pieces of phrase performance information corresponding to the read-out pieces of phrase-discriminating information, to give automatic performance based on the read-out pieces of phrase performance information. A chord of any of the pieces of phrase performance information to be set in performance thereof can be designated, and the CPU changes a note of the read-out phrase performance information according to the designated chord.

15 Claims, 13 Drawing Sheets

FIG.6

PATTERN-FORMING PICTURE

| | PATTERN NO. : 5 MEASURE NUMBER : 4 | | | | |
|---|---|---|---|---|---|
| CA | TONE COLOR | 0(DEFAULT) | 0(DEFAULT) | 0(DEFAULT) | 7(PIANO) |
| CB | TR | 1 | 2 | 3 | 4 |
| C1 | 1 | GA 08M026 | | DR 08M014 | |
| C2 | 2 | | BA 08M002 | | |
| C3 | 3 | GA 08M028 | | | US 08M001 |
| C4 | 4 | | | | |

C

PATTERN DATA FORMAT

PHRASE DATA FORMAT

AUTOMATIC PERFORMANCE DEVICE

BACKGROUND OF THE INVENTION

1. Field of the Invention

This invention relates to an automatic performance device which facilitates preparation of pattern data.

2. Prior Art

Automatic performance devices in general are constructed such that automatic performance is carried out by playing back in a parallel or simultaneous manner performance data for respective musical instruments recorded on a plurality of tracks, whereby musical tones are sounded like an ensemble of a mixture of a plurality of musical instrument tones.

It generally requires much labor and time to prepare data for automatic performance and record them onto tracks. To reduce the labor and time, conventionally parts of a music which are repeatedly performed are recorded onto a pattern track which is provided separately from other tracks, and in automatic performance performance data recorded on the pattern track are repeatedly read out for performance, while musical tones of the performance data are suitably varied according to a chord selected during performance.

However, according to the conventional pattern recording, performance patterns to be recorded have to be reedited into a predetermined chord (e.g. Cmaj7) before being input to the automatic performance device for recording, as disclosed, e.g. by Japanese Provisional Patent Publication (Kokai) No. 61-292689 and U.S. Pat. No. 4,674,383 corresponding thereto. This requires a very complicated input operation even for a skilled player with profound musical knowledge, and it is almost impossible for a beginner to set performance patterns as desired.

Moreover, it is impossible for those who are not proficient in performance technique to input performance patterns by means of realtime performance. Therefore, in general, performance patterns are input in a stepwise manner, i.e. musical tone data of performance patterns are input one by one. However, according to this stepwise inputting, the player cannot ascertain the performance patterns through reproduction thereof before they are recorded onto the track, which makes the editing or correcting operation difficult to carry out.

SUMMARY OF THE INVENTION

It is an object of the invention to provide an automatic performance device which enables inputting performance patterns according to any desired chord, and also facilitates the input operation even by beginners.

A further object of the invention is to provide an automatic performance device which enables preparation of performance patterns while ascertaining the performance patterns by the ear.

Preferably, the automatic performance device according to the invention includes playback chord-designating means for designating a chord of at least one of the pieces of phrase performance information to be set in performance thereof, and wherein the performance means changes a note of the at least one of the pieces of the phrase performance information read out by the performance means, according to the chord designated by the playback chord-designating means.

More specifically, the plurality of pieces of phrase performance information each include phrase chord information indicative of a chord name corresponding to performance thereof, the performance means changes the note of the at least one read-out phrase performance information according to correspondence between the phrase chord information and the chord designated by the playback chord-designating means.

Preferably, the performance means changes the at least one read-out phrase performance information based on the phrase chord information to performance information based on a predetermined reference chord, and then changes the performance information based on the predetermined reference chord to performance information based on the chord designated by the playback chord-designating means.

Preferably, the plurality of pieces of performance pattern information each include information on a sequence of performance of pieces of phrase performance information corresponding to a plurality of parts.

Preferably, the plurality of pieces of performance pattern information each include tone color-designation information indicative of designation of a tone color to be set in performance of each of the plurality of pieces of phrase performance information, the performance means giving automatic performance based on the read-out pieces of phrase performance information with tone colors designated according to the tone color-designation information.

Also preferably, the plurality of pieces of phrase performance information each include tone color-designation information indicative of designation of a tone color to be set in performance of each of the plurality of pieces of phrase performance information, the performance means giving automatic performance based on each of the read-out pieces of phrase performance information with the tone color designated according to the tone color-designation information.

More preferably, the plurality of pieces of performance pattern information each include second tone color designation information indicative of whether a tone color to be set in performance of each of the plurality of pieces of phrase performance information should be a tone color preset and stored for the each of the plurality of pieces of phrase performance information or should be another particular tone color, the performance means giving automatic performance based on each of the read-out pieces of phrase performance information with the tone color preset and stored therefor when the second tone color designation information indicates the preset and stored tone color, and giving automatic performance based on each of the read-out pieces of phrase performance information with the another particular tone color when the second tone color designation information indicates the another particular tone color.

In a preferred form, the performance pattern memory has a plurality of storage areas corresponding, respectively, to a plurality of measures (bars), the plurality of pieces of the phrase-discriminating information being stored in the plurality of storage areas in an arrangement corresponding to the sequence in which the plurality of pieces of phrase performance information are to be performed.

Advantageously, the plurality of pieces of phrase performance information each include information for specifying a musical instrument or a performance style in performance of the each plurality of pieces of phrase performance information, information for specifying a beat in performance of the each plurality of pieces of phrase performance information, and/or information for specifying at least introduction performance, main performance, fill-in performance and ending performance in performance of the each plurality of pieces of phrase performance information.

Also advantageously, the automatic performance device according to the invention includes a song memory for storing a plurality of pieces of pattern-discriminating information in an arrangement corresponding to a sequence of performance of the plurality of pieces of performance pattern information, and pattern-discriminating information-reading means for reading out the plurality of pieces of pattern-discriminating information from the song memory in the sequence of performance of the plurality of pieces of performance pattern information, and wherein each of the plurality of pieces of phrase-discriminating information is read out from the performance pattern memory according to each of the plurality of pieces of pattern-discriminating information, and a corresponding one of the plurality of pieces of phrase performance information is read out according to the each read-out phrase-discriminating information.

Preferably, the plurality of pieces of phrase performance information include phrase performance information input by the operator.

The above and other objects, features, and advantages of the invention will be more apparent from the following detailed description taken in conjunction with the accompanying drawings.

BRIEF DESCRIPTION OF THE DRAWINGS

FIG. 6 is a front view showing a display screen in pattern-forming mode;

DETAILED DESCRIPTION

The invention will now be described in detail with reference to the drawings showing an embodiment thereof.

Figure 1:
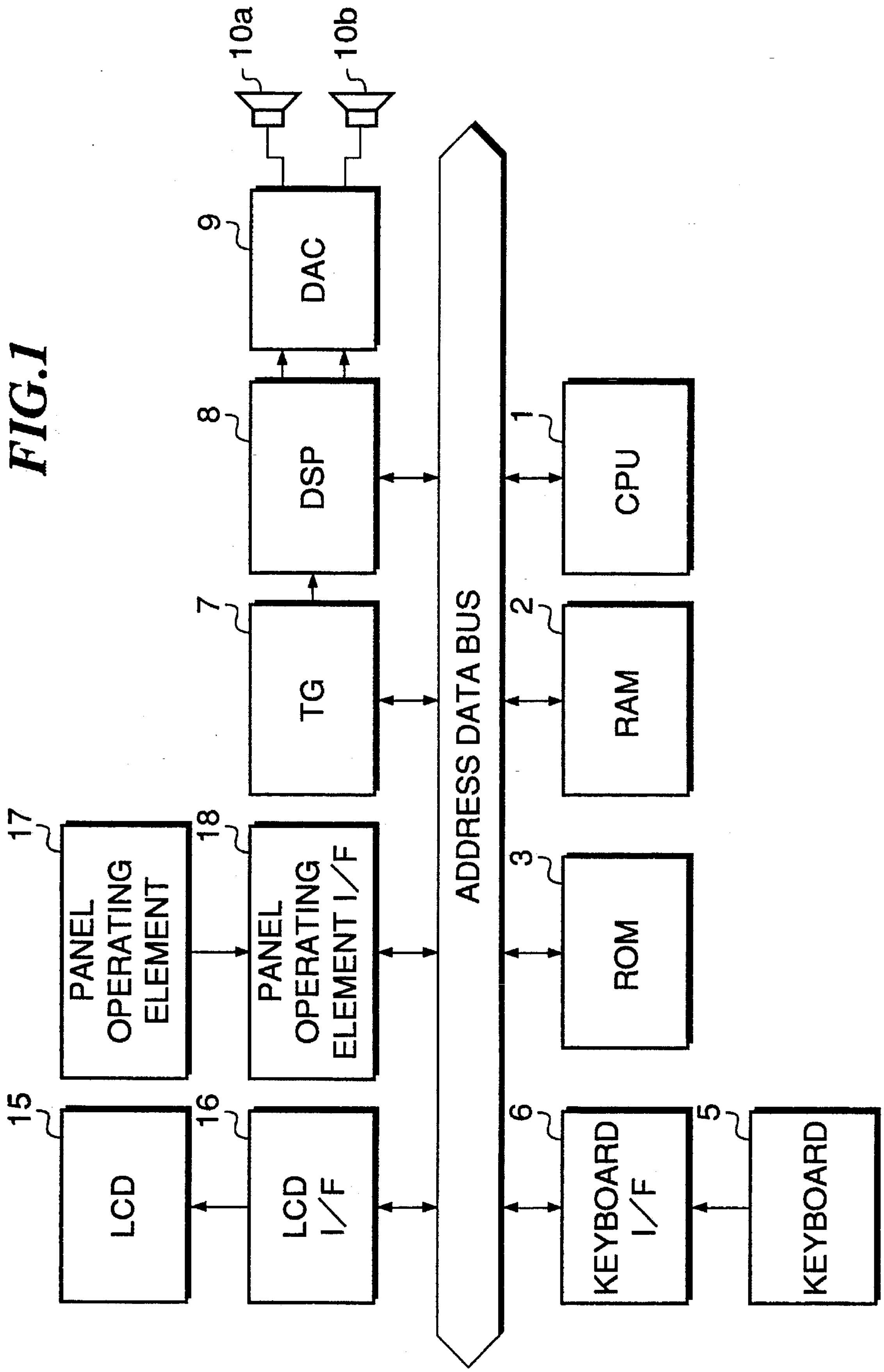
FIG. 1 is a block diagram showing the arrangement of an automatic performance device according to an embodiment of the invention.

Referring first to FIG. 1, there is illustrated the arrangement of an automatic performance device according to an embodiment of the invention. In the figure, reference numeral 1 designates a central processing unit (CPU) which controls various parts of the device. Reference numeral 2 designates a random-access memory (RAM) for storing song data used in automatic performance, user phrase data which is set by the user, as described hereinafter, performance pattern data, and various other data. The RAM 2 is backed up by a battery, not shown. Reference numeral 3 designates a read-only memory (ROM) which stores programs to be executed by the CPU 1, preset phrase data, referred to hereinafter, etc.

Reference numeral 5 designates a keyboard used in performance, from which signals corresponding to operation of various keys thereof are supplied to a keyboard interface 6. The keyboard interface 6 delivers, in response to the signals from the keyboard 5, a signal indicative of a key code for discriminating a key from others, a key-on signal indicative of key depression, a key-off indicative of key release, a signal indicative of key velocity representing key depressing touch, etc.

Reference numeral 7 designates a tone generator, which generates musical tone signals of designated tone colors at designated timing, under the control by the CPU 1. Musical tone signals generated by the tone generator 7 are subjected to predetermined processing by a signal processing circuit 8, and the processed signals are sounded out via loudspeakers **10*a* and 10*b***.

Figure 2:
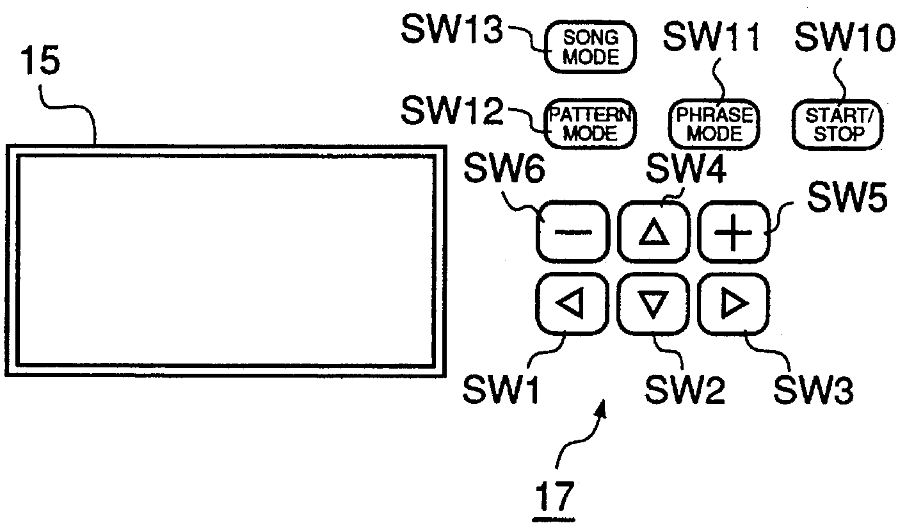
FIG. 2 is a front view showing a liquid crystal display (LCD) and panel operating elements employed in the embodiment.
Figure 3:
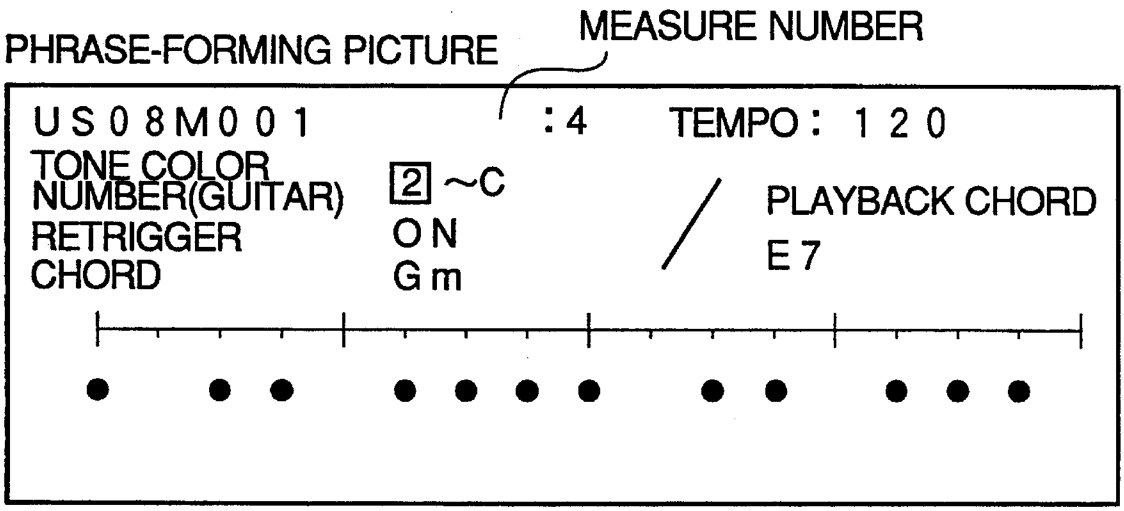
FIG. 3 is a front view showing a display screen in phrase-forming mode.

Reference numeral 15 designates a liquid crystal display (LCD), which has a rectangular display surface as shown in FIG. 2. The LCD 15 is controlled by an LCD interface 16 responsive to various display command signals from the CPU 1 to make various displays on the display surface. For example, it provides a display as shown in FIG. 3, during a phrase-forming processing, described hereinafter.

Reference numeral 17 designates panel operating elements, which are comprised of various switches arranged in the vicinity of the LCD 15, as shown in FIG. 2.

In FIG. 2, symbols SW1 to SW4 represent cursor switches for moving a cursor on the display screen. By operating any of the cursor switches SW1 to SW4, the cursor moves on the screen in a direction indicated by an arrow printed on the operated cursor switch. Symbols SW5 and SW6 represent switches for incrementing and decrementing numerical values displayed on the screen, respectively. Symbol SW10 represents a start/stop switch for instructing start and stop of automatic performance. Symbols SW11 to SW13 represent switches for setting various modes of operation of the device. When any of the switches is depressed, the device enters an operating mode set by the depressed switch.

Figure 4:
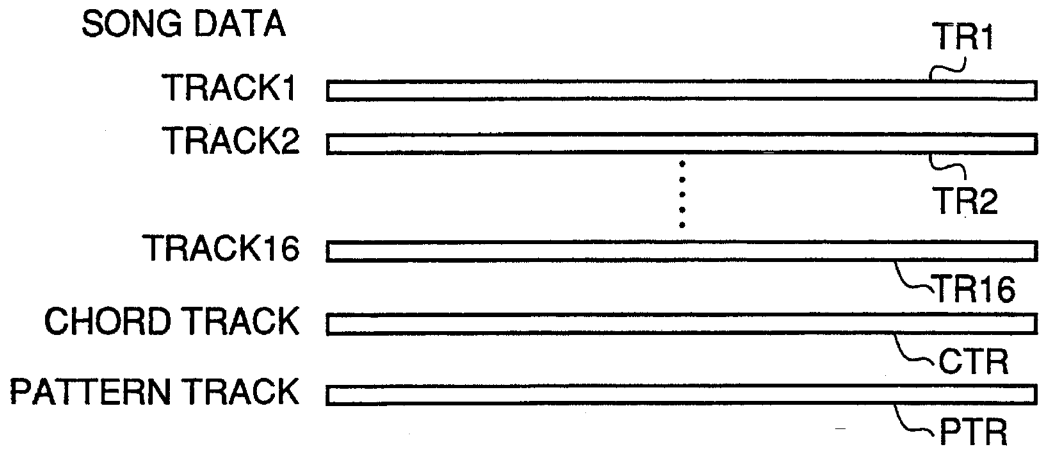
FIG. 4 is a diagram showing a data format of song data.

Description will now be made of song data which are stored into the RAM 2, with reference to FIG. 4 which schematically shows tracks constituting song data. As illustrated in the figure, a piece of song data is formed by tracks TR1 to TR16, a chord track CTR, and a pattern track PTR. The RAM 2 normally stores a plurality of pieces of song data, each of which has the same track arrangement as the one shown in FIG. 4.

The tracks TR1 to TR16 store performance data for respective musical instruments. The performance data are each comprised of event data indicative of on/off of keys and note numbers, and duration data indicative of the time duration between adjacent event data. The chord track CTR stores chord data for instructing the chord of a music piece with the progress of the music. The pattern track PTR stores pattern numbers for instructing performance patterns (which repeatedly occur in the music piece) with the progress of the music.

Figure 5:
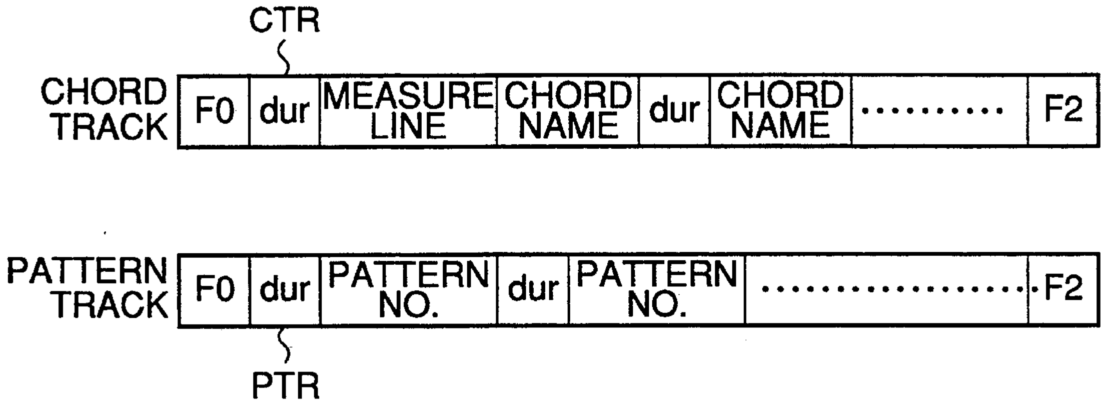
FIG. 5 is a diagram showing data formats of a code track TR and a pattern track PTR appearing in FIG. 4.

FIG. 5 shows data formats of the chord track CTR and the pattern track PTR. As shown in the figure, each track starts with a code "F0" indicative of the start of the track and terminates with a code "F2" indicative of the termination of the track. The chord track CTR has recorded thereon measure line data indicative of measure lines, chord data indicative of chord names, and duration data indicative of time durations, which are arranged in a sequence according to the progress of the music. The pattern track PTR has recorded thereon pattern number data indicative of numbers of performance patterns and duration data indicative of time durations, which are arranged in a sequence according to the progress of the music.

Next, the performance patterns employed in this embodiment will be described. According to the embodiment, the user or player need not prepare notes of a performance pattern one by one, but has only to prepare such notes by combining preset phrases with each other.

In the present specification, the term "phrase" means performance data having 1 to 8 measures (bars) recorded on a track (i.e. sequence data for sequentially designating musical tones to be generated), which normally sets a performance having a single tone color. The phrase comprises two kinds of phrases, i.e. a preset phrase which is previously set, and a user setting phrase which the user sets (referred to hereinafter as "user phrase"). As the preset phrase, 2000 to 3000 kinds are stored in the ROM 3, and as the user phrase, phrases which are set by the user are stored into the RAM 2.

i) Preset Phrase

The preset phrase is classified according to Musical instrument/Performance style, Beat, and Section. Phrases in each class are designated by serial numbers (referred to hereinafter as "phrase numbers"). For example, there are the following classes according to Musical instrument/Performance style:

DR: Drums

PC: Percussion

BA: Bass

GS: Guitar Strummed

GA: Guitar Arpeggios

GR: Guitar Riffs

The classification according to Beat has six kinds, i.e. 1, 2, 4, 8, 16, and 32.

The term "section" means a musical function in a music to be performed. For example, the classification according to Section is as follows:

I: Introduction (performance pattern suitable for introduction)

M: Main (performance pattern for general accompaniment)

E: Ending (performance pattern suitable for ending a music)

F: Fill-in (performance pattern suitable for a "fill-in" performance which imparts variations to a music)

In the present embodiment, a phrase is specified by a classification code such as "GA08M026". This classification code means that the musical instrument/performance style is Guitar Arpeggios (GA); the beat is 8 beats (08); the section is a general accompaniment pattern (M); and the phrase is a 26th one (026) of the phrases belonging to the same classification. Similarly, a phrase for Bass and a phrase for Drums are specified by classification codes "BA08M002" and "DR08M014", respectively, for example. However, in processing inside the device, each phrase is specified or identified by a serial number, in place of a classification code.

ii) User Phrase

Now, how to prepare a user phrase will be described. First, the mode switch SW11 is depressed to set the operating mode to a phrase-forming mode, wherein a phrase-forming picture is displayed on the screen of the LCD 15, and a cursor C appears on the screen, as shown in FIG. 3. The user or player moves the cursor C by selectively operating the cursor switches SW1 to SW4 to set or vary data at a location pointed to by the cursor C. The setting or varying operation is carried out in the following manner:

First, the user or player determines the classification of the user phrase to be prepared. Symbol "US" in a classification code "US08M001" appearing on the screen indicates that the phrase is a user phrase, but the symbol "US" is fixed for the present device and cannot be changed by the user. The numerical value "08" in the classification code indicates the beat. By depressing the switch SW5 (+) or SW6 (−), numerical values indicating the beat, i.e. 01, 02, 04, 08, 16, and 32 are cyclically displayed in a numerically increasing or decreasing direction. Then, the user sets a desired beat by selectively operating the switches while looking at the screen. Symbol "M" in the classification code indicates the section. The user can select a desired section I, M, E, or F by first pointing the cursor C to the location of "M" and then selectively operating the switch SW5 and/or the switch SW6, similarly to the above. Further, the user can set a desired number for the user phrase thus classified by moving the cursor C to the location of "001" in the classification code and operating the switch SW5 and/or the switch SW6 similarly to the above. Similarly, the measure number, the tempo, and the tone color number can be set. The measure number can be arbitrarily set to any one of 1 to 8.

The region "RETRIGGER" on the screen of FIG. 3 is for selecting a position "ON" or a position "OFF". If the position "ON" is selected, the note (the scale of a musical tone formed by the phrase) will be changed and the musical tone resounded upon a change in the chord during automatic performance, whereas if the position "OFF" is selected, only the note will be changed without resounding of the musical tone even with a change in the chord. The region "CHORD" on the FIG. 3 screen is for selecting the chord of a phrase to be prepared by the user, from among a plurality of chords such as A–G#, Am–G#m, and A7–G#7, Inputting of performance data constituting a user phrase is carried out by the use of the keyboard 5. The manner of inputting performance data includes two manners, i.e. real-time inputting and stepwise inputting, as in conventional devices. The gauge displayed at a lower portion of the screen indicates measure lines (longer vertical lines) and beats (shorter vertical lines). Black dots indicate that musical tone data have been input at timing corresponding to the black dots. In the stepwise inputting, the cursor C is moved below a beat at which it is desired to input performance data, and then the keyboard 5 is operated. In the illustrated example, the gauge shows only four measures. By operating the cursor switch SW1 ("←") and/or the switch SW3 ("→") to shift the gauge in the left direction or in the right direction direction, the gauge can show up to 8 measures.

The user phrase set in the above manner can be sounded for confirmation by automatic performance during which the user can designate any desired chord. That is, performance for confirmation can be made with a chord different from one selected by the user in setting the phrase. Chords which can be designated during confirmation performance are displayed at "PLAYBACK CHORD" on the screen. Then, the user moves the cursor C to this region to select a desired chord. A user phrase thus prepared is stored into the RAM 2 at a predetermined area together with a phrase number corresponding to the classification of the prepared user phrase.

Also a preset phrase read from the ROM 3 can be displayed on the screen of FIG. 3. However, the preset phrase can be changed only in respect of data set or changed by the regions "RETRIGGER" and "PLAYBACK CHORD". Data changed by "RETRIGGER" are stored into the RAM 2, with reference to which automatic performance will be given.

Figure 8:
FIG. 8 is a diagram showing a format of phrase data.

FIG. 8 shows a format of phrase data. The format is common to both the user phrase and the preset phrase. If a data changing operation by "RETRIGGER" was carried out, a retrigger flag for the preset phrase is set depending upon the changed data stored in the RAM 2, during automatic performance. Performance data in the format consist of duration data and event data, similarly to the tracks TR1 to TR16 of song data.

iii) Performance Pattern

Next, how to prepare performance patterns will be described. First, the mode switch SW12 is depressed to display a performance pattern-forming picture on the screen of the LCD 15, as shown in FIG. 6. In the embodiment, a performance pattern is formed by eight tracks 1 to 8, to which are preset phrases or user phrases are allotted. That is, a performance pattern is formed by allotting phrases to the tracks.

In the performance pattern-forming picture of FIG. 6, "PATTERN NUMBER" appearing at a left side of the uppermost row is for discriminating performance patterns. A performance pattern prepared is stored into the RAM 2 together with the pattern number. To change the pattern number, the cursor C is moved to the region "PATTERN NUMBER", and then the switch SW5 and/or the switch SW6 is operated to increase or decrease the value of the pattern number. "MEASURE NUMBER" appearing at a middle portion of the uppermost row indicates the length of the performance pattern. In the illustrated example, the pattern has a length of four measures. The number of measures can be freely set within a range of 1 to 8. The measure number-setting operation can be made similarly to the setting of the pattern number.

The row "CB" on the FIG. 6 screen has track numbers displayed thereon. In the illustrated example, only four tracks are displayed, but by operating the switch SW1 and/or the SW3, the picture moves in the left direction or in the right direction to thereby enable displaying eight tracks at the maximum.

The row "CA" has tone color numbers displayed thereon. When a value "0" is displayed in the row "CA", a default tone color is designated. That is, a tone color, which is previously set for a phrase allotted to the track is designated. The rows C1, C2, C3, and C4 correspond, respectively, to first to fourth measures. In the illustrated example, only four measures are displayed, but by operating the switch SW2 and/or the SW4, the picture moves in the upward direction or in the downward direction to thereby enable displaying eight measures at the maximum.

In the FIG. 6 setting, in the track 1, a phrase having a classification "GA08M026" is allotted at the first measure, and the second row C2 corresponding to the second measure is blank. This means that the phrase of "GA08M026" at an immediately preceding measure, i.e. the first measure continues also to the second measure. Similarly, a phrase of "GA08M028" is allotted to the third measure, which continues to the fourth measure. It is shown that in the track 1, the musical instrument/performance style is "GA" and the tone color is "0", and therefore a musical tone according to Guitar Arpeggios has been set in the track 1.

Next, the track 2 has "no sound" allotted to the first measure, and a phrase of "BA08M002" to the second to fourth measures, as illustrated in FIG. 6. The track 3 has a phrase of "DR08M014" allotted to the first to fourth measures. The track 4 has a user phrase of "US08M001" allotted to the third and fourth measures. However, in the track 4 a value "7" indicative of piano is set as the tone color number, as illustrated, and therefore a tone color according to piano will be designated during automatic performance, irrespective of a tone color set during preparation of the user phrase (see "TONE COLOR NUMBER" in FIG. 3).

Setting of a phrase is carried out by first moving the cursor C to a measure of a track at which phrase data is to be written. More specifically, in the case of writing at the first measure of the track 1, the cursor C is moved to the region "GA", and then the switch SW5 or SW6 is operated to select a desired musical instrument/performance style or a user phrase. Then, similarly, the cursor C is moved to the regions "08", "M", and "026", successively in the order mentioned, while operating the switch SW5 and/or the switch SW6, to thereby select a desired beat, section, and number.

Figure 7:
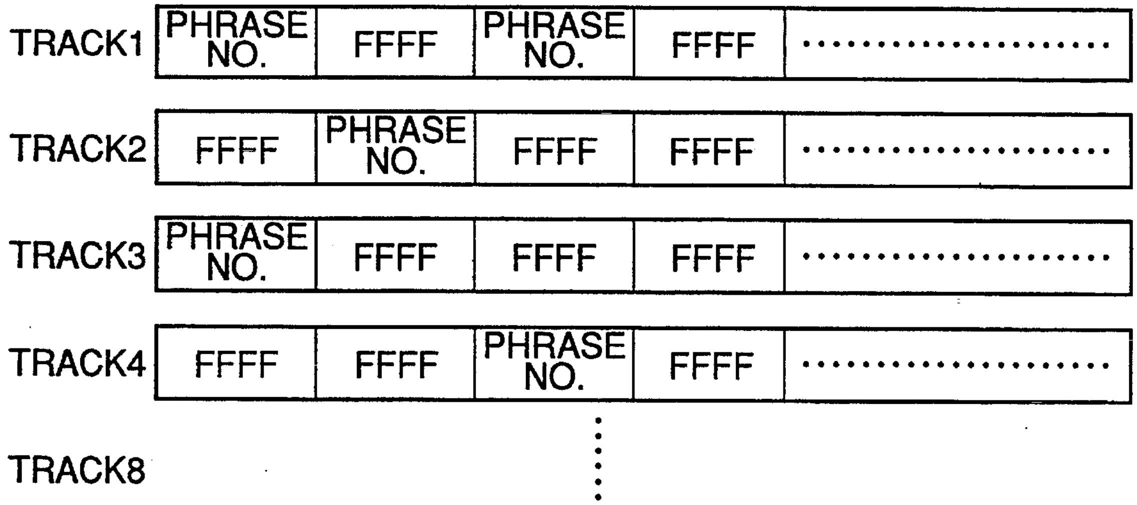
FIG. 7 is a diagram showing a format of performance pattern data corresponding to the performance pattern appearing in FIG. 6.

FIG. 7 shows a format of performance pattern data. The illustrated state corresponds to the above described setting in FIG. 6. The data "FFFF" correspond to the blank spaces in FIG. 6. Pattern data is data which is repeatedly performed. In the example illustrated in FIG. 6, when the first to fourth measures have been performed, performance is again started from the first measure.

Now, the operation of the present embodiment will be described.

(1) Main Routine

Figure 9:
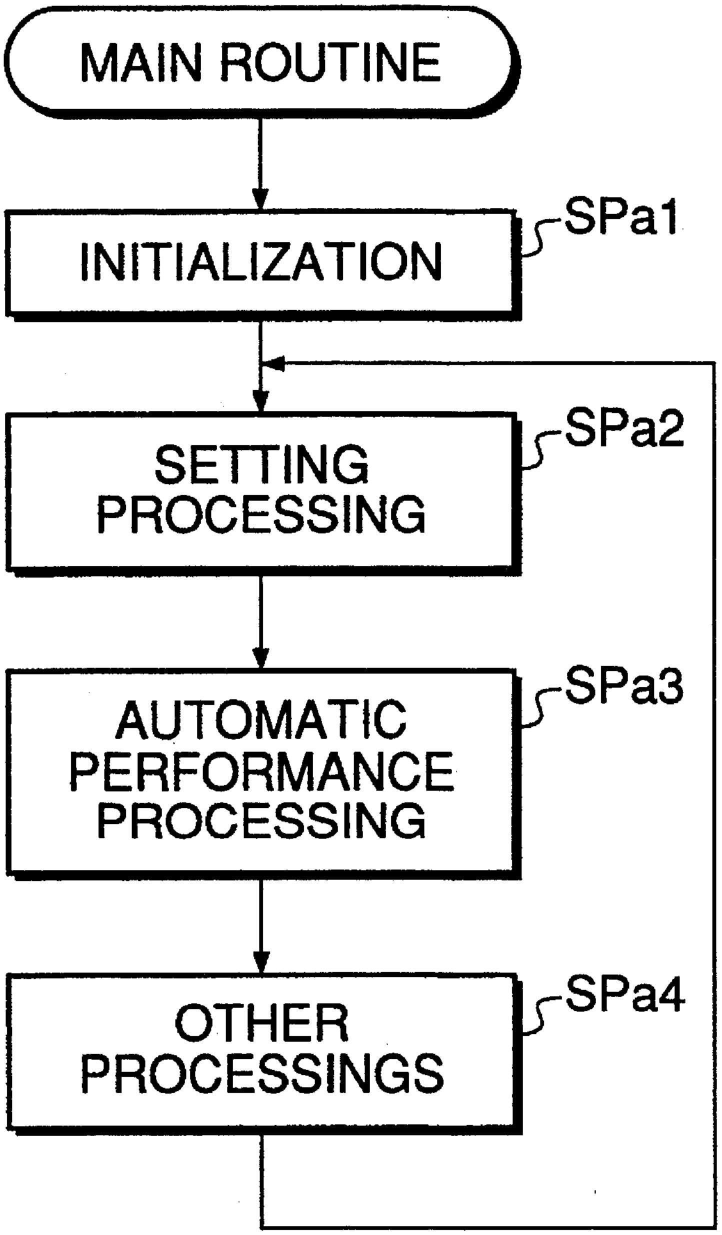
FIG. 9 is a flowchart showing a main routine according to the embodiment.
Figure 10:
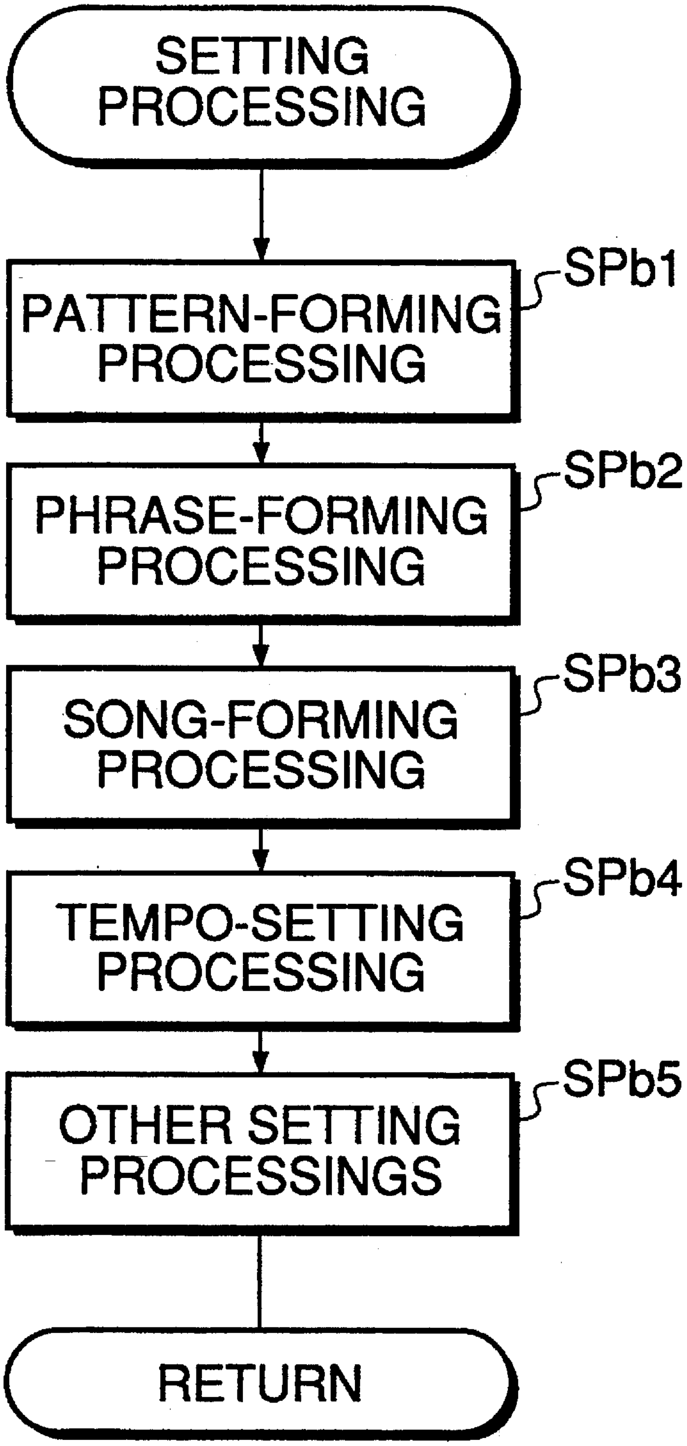
FIG. 10 is a flowchart showing details of a setting processing in FIG. 9.

FIG. 9 shows a main routine according to the embodiment. First, at a step SPa1, values of various registers, etc. are initialized. At a step SPa2, various settings are made. FIG. 10 shows details of the setting subroutine executed at the step SPa2. A pattern-forming processing at a step SPb1 and a phrase-forming processing at a step SPb2 are carried in the above described manners. At a step SPb3, a song-forming processing is carried out, wherein performance data are set onto the tracks TR1 to TR16 for song data shown in FIG. 4. The setting of performance data is carried out by realtime inputting or by stepwise inputting, by means of the keyboard 5, in a manner similar to the conventional method.

Then, at a step SPb4, a tempo-setting processing is carried out to set the tempo of automatic performance by operating a predetermined operating element, not shown, of the panel operating elements 17. Then, at a step SPb5, other processings, such as setting of tone color, etc. are carried out.

Of the above setting steps, the steps SPb1, SPb2, and SPb3 are executed, respectively, when a pattern mode, a phrase mode, and a song mode are set, whereas the steps SPb4 and SPb5 are always executed irrespective of the set mode.

Figure 11:
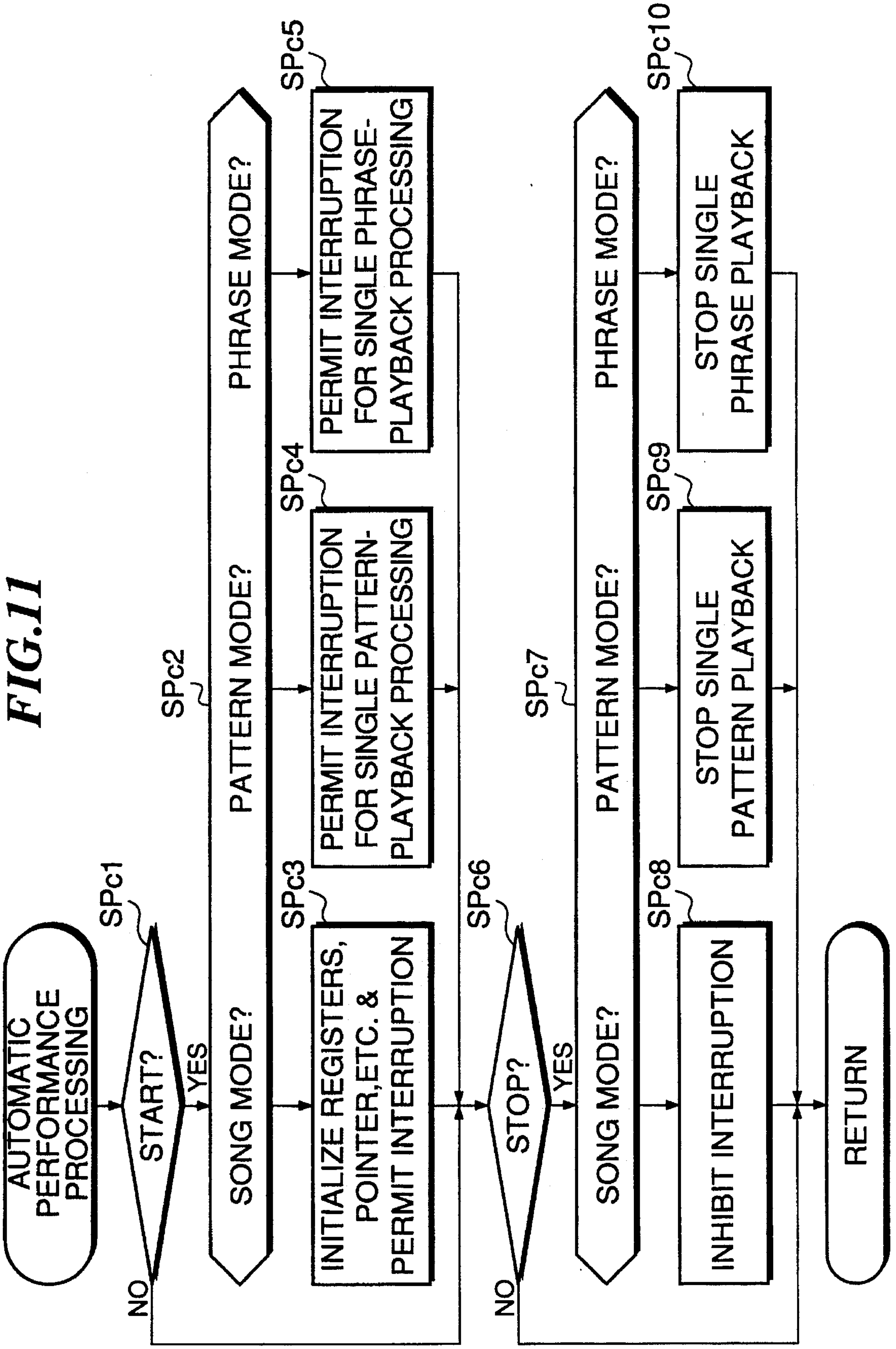
FIG. 11 is a flowchart showing details of an automatic performance processing in FIG. 9.

After execution of the processing of the step SPb5, the program returns to the main routine in FIG. 9 to execute an automatic performance processing at a step SPa3. FIG. 11 shows details of the automatic performance processing, which is executed in different manners dependent upon the set modes. After completion of the automatic performance processing, the program proceeds to a step SPa4 wherein other processings are carried out, followed by the program returning to the step SPa2. Thereafter, the steps SPa2, SPa3, and SPa4 are sequentially executed.

Since as mentioned above, the automatic performance processing is carried out in different manners dependent upon the set modes, description of the operation will be made mode by mode, hereinbelow:

(2) Phrase Mode

When the mode switch SW11 is pushed, the device enters the phrase mode, wherein the phrase-forming processing is carried out at the step SPb2. As described previously, in this mode a phrase-forming picture as shown in FIG. 3 appears on the screen of the LCD 15, and then the user operates the panel operating elements 17 with reference to the display, thereby forming a user phrase. Further, the user can read out a preset phrase from the ROM 3 and display setting particulars thereof on the LCD screen.

When the start/stop switch SW10 in FIG. 2 is not operated (i.e. the automatic performance is not being carried out), the answer to the question of a step SPc1 in FIG. 11 is negative ("NO"), and that of a step SPc6 is also negative ("NO"), and then the program returns to the main routine, wherein the phrase-forming processing is again carried out at the step SPb2. That is, when the start/stop switch SW10 is not depressed, phrase inputting or phrase monitoring is carried out with reference to the display on the LCD 15.

On the other hand, when the start/stop switch S10 is depressed while the automatic performance is in stoppage, the program proceeds through the step SPc1 and a step SPc2 to a step SPc5, wherein an interrupt for a single phrase-playback processing is permitted. In the interrupt processing, interruption is carried out a predetermined number of times (24 or 48) per one quarter note. Whenever interruption is carried out, the single phrase-playback processing is started.

In the single phrase-playback processing, phrase data displayed on the phrase-forming picture of FIG. 3 is read out, and automatic performance is carried out based on performance data of the read-out phrase data. More specifically, phrase data shown in FIG. 8 is read out based on the phrase number, the performance data of the read-out phrase data is processed for reproduction whenever interruption is carried out. Whenever the single phrase-playback processing is started by interruption, the duration of the duration data dur is decremented, and when the duration of the duration data is reduced to "0", the next event data EV is processed. For example, if the event data EV contains key-on data, key-code data, and key velocity data, these data are transferred by the CPU 1 to the tone generator 7, which generates a musical tone signal corresponding to these data, whereby musical tones are generated via the loudspeakers 10*a*, 10*b*. If the event data EV contains key-off data and key code data, these data are transferred by the CPU 1 to the tone generator 7, whereby a corresponding musical tone signal ceases to be generated or suddenly damped or attenuated.

(a) Code Processing

In the single phrase-playback processing, the phrase is reedited by changing the chord to a chord designated at the region "PLAYBACK CHORD" in FIG. 3 before the phrase is processed for generation of musical tones. In the example illustrated in FIG. 3, the phrase prepared with Gm is changed into one with E7. This chord changing processing is effected, e.g. by changing the chord to a reference chord and then changing the reference chord to the designated chord. More specifically, if the reference chord is set to C major, first the note of the phrase is changed with change of the root (G→C), and then the note is changed with change of the chord type (major, minor, seventh, major seventh, etc.) (In the FIG. 3 example, minor→major). Then, again, to change the chord to the designated chord, changing of the note with change of the root and changing of same with the chord type are carried out. In this way, the chord is changed from Gm to C major, and then from C major to E7.

The changing of the note with change of the root can be made by transposition, i.e. by a simple note-increasing or decreasing calculation according to an interval corresponding to the change of the root. The changing of the root with change of the chord type is effected by the use of a chord conversion table, not shown, which is stored in the ROM 3. In this connection, the transposition and the chord conversion table are disclosed by Japanese Provisional Patent Publication (Kokai) No. 61-292689, etc. The chord changing processing may be carried out in any other well-known manner.

In the above described manner, musical tones of the designated phrase are sequentially generated by the interrupt processing.

Following the processing of the step SPc5, the program proceeds to the step SPc6 to execute the same, followed by returning to the main routine to again execute the phrase-forming processing at the step SPb2. In this way, the phrase-forming processing and the single phrase-playback processing are carried out on a time sharing basis, but in a parallel manner. As a result, in preparing a user phrase, the user can ascertain the phrase which is being prepared or has just been prepared, by the ear, and further, in monitoring a preset phrase, he can confirm musical tones generated from the present phrase.

When the start/stop switch SW10 is again pushed after it is pushed as above, the CPU 1 instructs stopping the automatic performance, and inhibits interruption for the single phrase-playback processing.

(3) Pattern Mode

When the mode switch SW2 shown in FIG. 2 is depressed, the device enters the pattern mode. Then, the pattern-forming picture of FIG. 6 appears on the screen of the LCD 15, for carrying out the pattern-forming processing. The user operates the panel operating elements 17 with reference to the screen of the LCD 15 to prepare a performance pattern.

When the start/stop switch SW10 is not depressed (i.e. the automatic performance is in stoppage), the answer to the question of the step SPc1 in the automatic performance processing of FIG. 11 is negative ("NO"), and that of the step SPc6 is negative ("NO"), and then the program returns to the main routine, wherein the pattern-forming processing is again carried out at the step SPb1.

That is, when the start/stop switch SW10 is not depressed, the pattern-forming processing alone is carried out with reference to the screen of the LCD 15.

On the other hand, when the start/stop switch SW10 is depressed, the program proceeds through the steps SPc1, SPc2 to a step SPc4 in FIG. 11, wherein an interrupt for a single pattern-playback processing is permitted.

(a) Single Pattern-playback Processing

Figure 12:
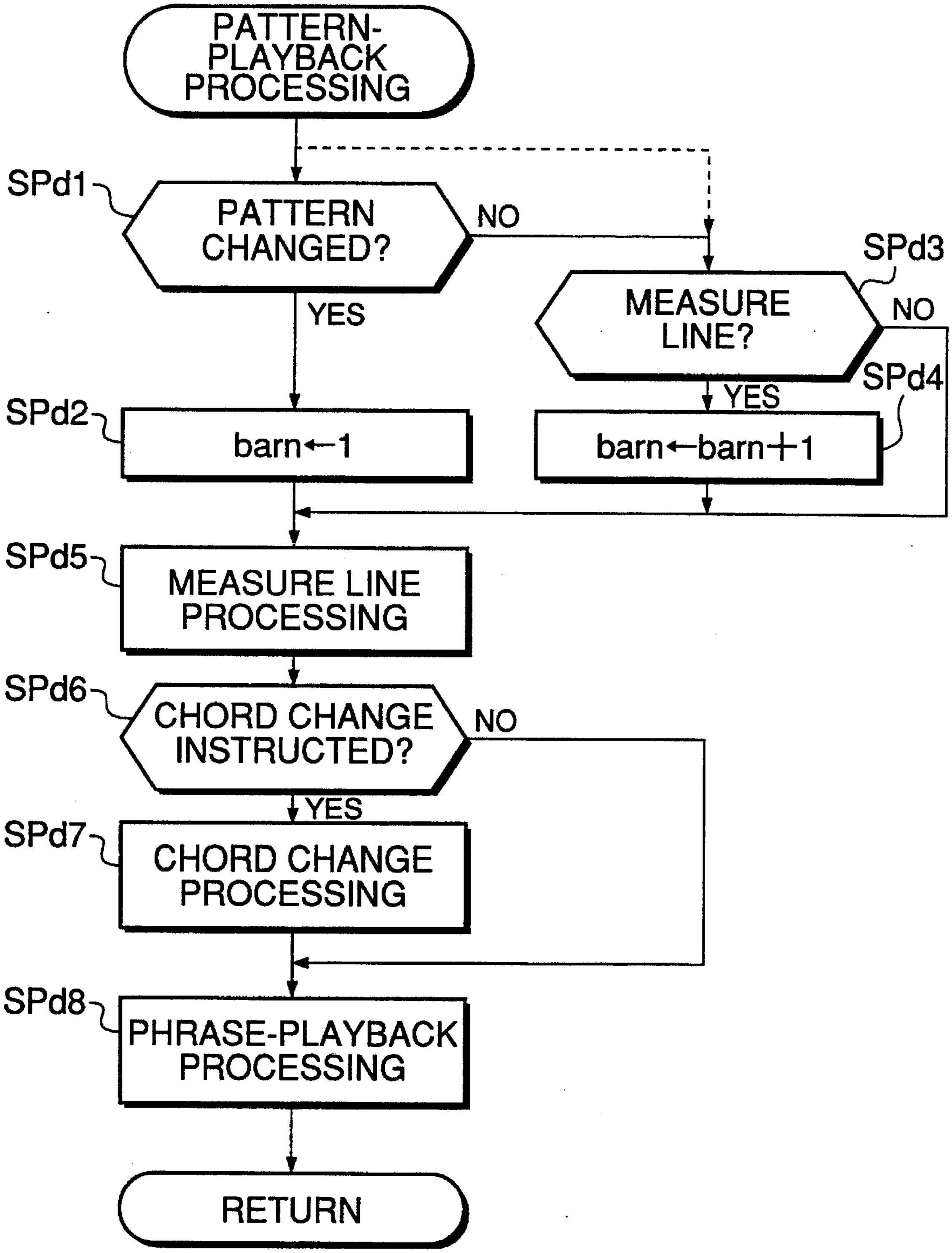
FIG. 12 is a flowchart showing details of a pattern playback processing in FIG. 9.

The single pattern-playback processing is intended to reproduce a performance pattern having a pattern number displayed on the pattern-forming picture of FIG. 6, and carries out automatic performance by reading out phrases constituting the performance pattern. FIG. 12 shows a pattern-playback processing, which is executed in the song mode, referred to hereinafter. The single pattern-playback processing is carried out in a similar manner to the processing of FIG. 12, and therefore the following description will be made with reference to FIG. 12. However, in the single pattern-playback processing, steps SPd1 and SPd2 in FIG. 12 are not executed, and the processing starts with a step SPd3, as indicated by the broken line. The single pattern-playback processing is started whenever a predetermined interrupt processing, not shown, is executed, similarly to the single phrase-playback processing.

At the step SPd3, it is determined whether or not measure line data has been read out. In the single pattern-playback processing, a combination of data for designating a chord C, duration data corresponding to one measure, and measure line data are cyclically read out. This is because a performance pattern is formed of a combination of a plurality of phrases which have individually been prepared with respective chords, and consequently performance cannot be effected without chord designation for the whole performance pattern. In this connection, combinations of data for designating the chord C, duration data corresponding to one measure, and measure line data are previously stored in the ROM 3, so that data of one of the combinations are repeatedly read out whenever the single pattern-playback processing is started by the interrupt processing. After the chord C has been designated, the duration of the duration data is decremented upon each interruption, and when the duration is reduced to "0", the measure line data is read out. After reading-out of the measure line data, the chord C is again designated at timing of the next interruption. In this way, designation of the chord C and reading-out of the measure line data are carried out in an endless manner.

The data for single pattern playback stored in the ROM 3 may be omitted, but the pattern playback may be carried out according to a chord designated by the player, instead. In this alternative case, the borders between measures may be discriminated by counting the number of times of interruption.

If the answer to the question of the step SPd3 is affirmative ("YES"), the program proceeds to a step SPd4 to increment a register barn by 1, and then proceeds to a step SPd5, whereas if the answer at the step SPd3 is negative ("NO"), the program jumps to the step SPd5. The register barn is set to "1" when the single pattern-playback processing is first started, to count the number of measures thereafter.

(b) Measure Line Processing

Figure 13:
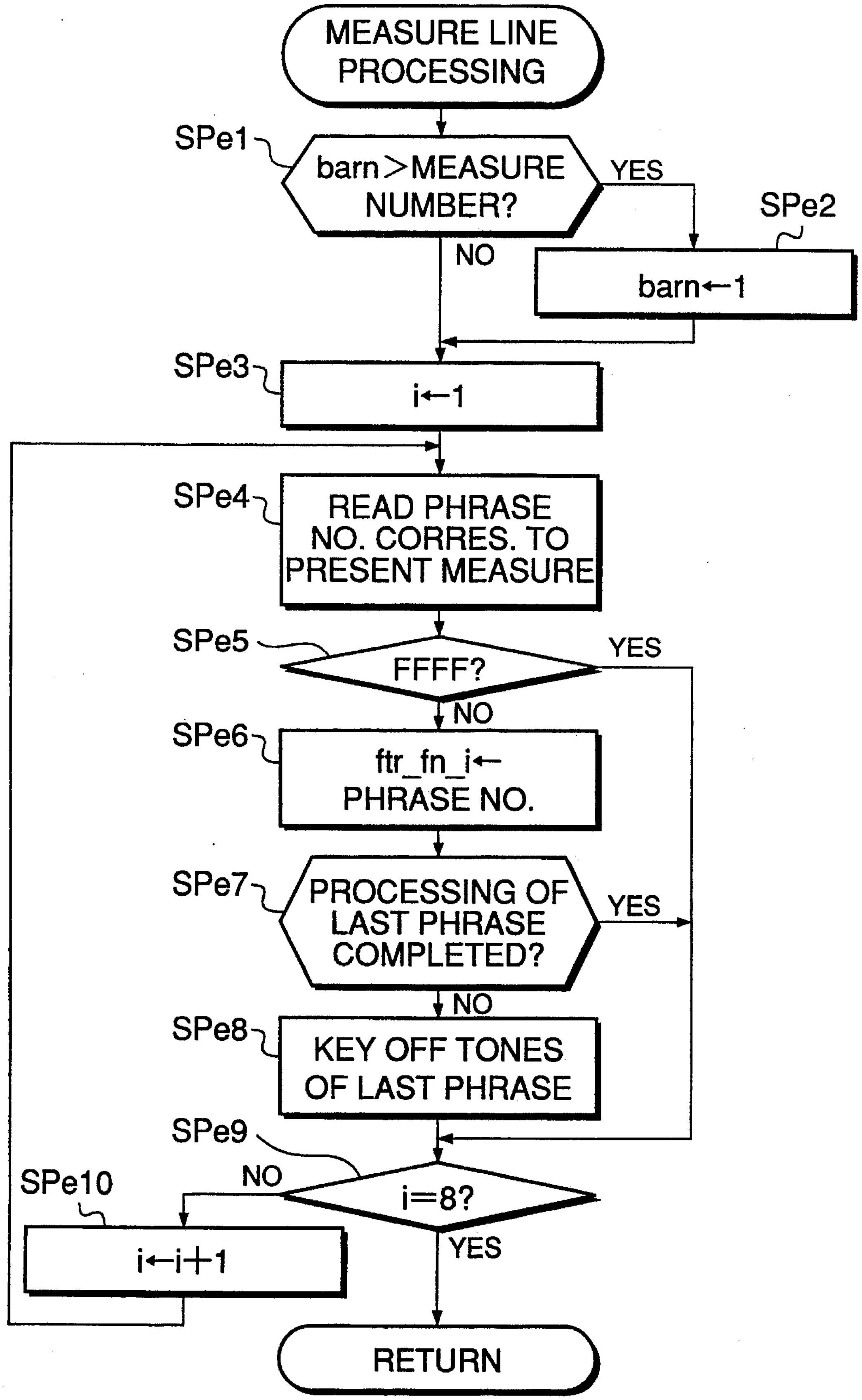
FIG. 13 is a flowchart showing details of a measure line processing in FIG. 12.

At the step SPd5, a measure line processing is carried out. FIG. 13 shows the measure line processing. The measure line processing of FIG. 13 is carried out in the song mode, but the measure line processing of the single pattern reproduction is carried in the same manner as the FIG. 13 processing, and therefore the following description will be made with reference to FIG. 13.

First, at a step SPe1, it is determined whether or not the value of the register barn exceeds a predetermined number of measures MN. This measure number MN is previously set by the user in preparing a performance pattern. That is, this measure number MN appears at a middle portion of the uppermost row of the pattern-forming picture of FIG. 6. If the answer to the question of the step SPe1 is affirmative ("YES"), the value of the register barn is reset to the initial value of "1" at a step SPe2, and then the program proceeds to a step SPe3, whereas if the answer at the step SPe1 is negative ("NO"), the program jumps to the step SPe3.

At the step SPe3, the value of a register i for counting phrase tracks is set to a value of "1". Then, at a step SPe4, a phrase number of a measure indicated by the register barn on the phrase track 1 (see FIG. 7) is read out. Then, at a step SPe5, it is determined whether or not the read-out phrase number is equal to "FFFF". If the phrase number is equal to "FFFF", this means that the immediately preceding phrase is still continuously applied or a "no sound" state is designated, and therefore the program jumps to a step SPe9 to determine whether or not the register i value is equal to 8. Since on this occasion the answer is negative ("NO"), the program proceeds to a step SPe10, wherein the register i value is incremented by 1, and then to the step SPe4 again.

On the other hand, if the answer to the question of the step SPe5 is negative ("NO"), the phrase number is stored into a register ftr_fn_i at a step SPe6. The register ftr_fn_i (i=1 to 8) is provided for the phrase tracks 1 to 8, to store a phrase number presently designated for each track.

Then, the program proceeds to a step SPe7, wherein it is determined whether or not the processing of the immediately preceding phrase has been completed. If the answer is affirmative ("YES"), the program jumps to the step SPe9, whereas if it is negative ("NO"), the program proceeds to a step SPe8, wherein tones of the immediately preceding being sounded is keyed off, and then the program proceeds to the step SPe9.

Figure 14:
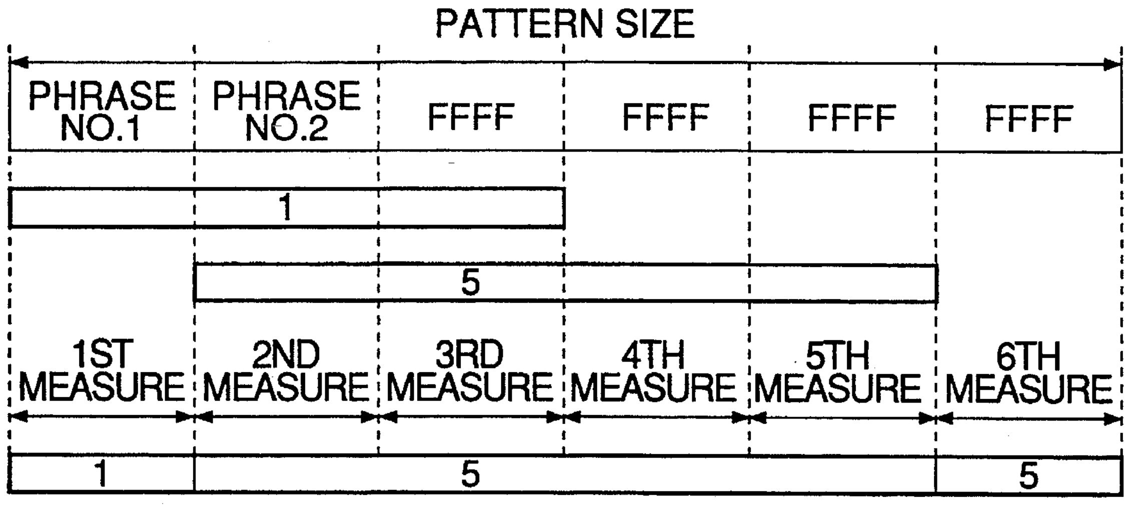
FIG. 14 is a diagram useful in explaining the measure line processing.

Details of the processing of the steps SPe7, SPe8 will now be described. FIG. 14 shows, by way of example, a phrase track having a pattern size corresponding to six measures. In the FIG. 14 example, a phrase number 1 is designated at the first measure, and a phrase number 5 at the second measure. At the other measures, no designation of phrase number is made, designating repetition of the phrase number 5 at these measures.

As previously stated, phrases can have respective lengths corresponding to 1 to 8 measures. In the illustrated example, a phrase 1 has a length corresponding to 3 measures, and a phrase 5 4 measures. Therefore, even when the processing reaches the second measure, the phrase having the phrase number 1 has not yet been finished in processing. As a result, if the phrase has a tone extending over two or more measures, even when it is switched over to the phrase having the phrase number 5 at the second measure, the tone is still continuously sounded. Therefore, the step SPe7 determines whether or not there is such a tone, and if there is such a tone, it is forcedly stopped from being sounded at the step SPe8. On the other hand, the next phrase number stored into the register ftr_fn_i at the step SPe6 will be used for starting generation of sound by a phrase processing, described hereinafter.

As shown in FIG. 14, the phrase having the phrase number 5 is again read out from the starting end thereof after it has been totally read out over the four measures. However, when timing for terminating the performance pattern is reached, the processing of the phrase with the phrase number 5 is forcedly terminated. That is, in the illustrated example, performance is given in the order of the first measure of the phrase number 1, the first to fourth measures of the phrase number 5, and the first measure of the phrase number 5, and thereafter performance is repeated in the order mentioned.

When the processing of the steps SPe4 to SPe10 described above has been carried out up to the phrase crack 8, the answer to the question of the step SPe9 becomes affirmative ("YES"), and then the program returns to the single pattern-playback processing, wherein a step SPd6 is executed. At the step SPd6, it is determined whether or not an instruction has been made to change the chord. In the song mode, referred to hereinafter, data for designating the chord are sequentially supplied from the chord track CTR, so that changing of the chord frequently takes place. However, in the single pattern-playback processing, the chord C is designated by default as previously stated, and therefore the answer to the question of the step SPd6 is negative ("NO"), and then the program proceeds to a step SPd8 for the phrase-playback processing. In the present embodiment, even in the single pattern-playback processing, the chord can be designated as desired by manual operation. When the chord-designating operation has been done, the answer to the question of the step SPd6 becomes affirmative ("YES"), and then a chord change processing is carried out at a step SPd7.

(c) Phrase-playback Processing

Figure 15:
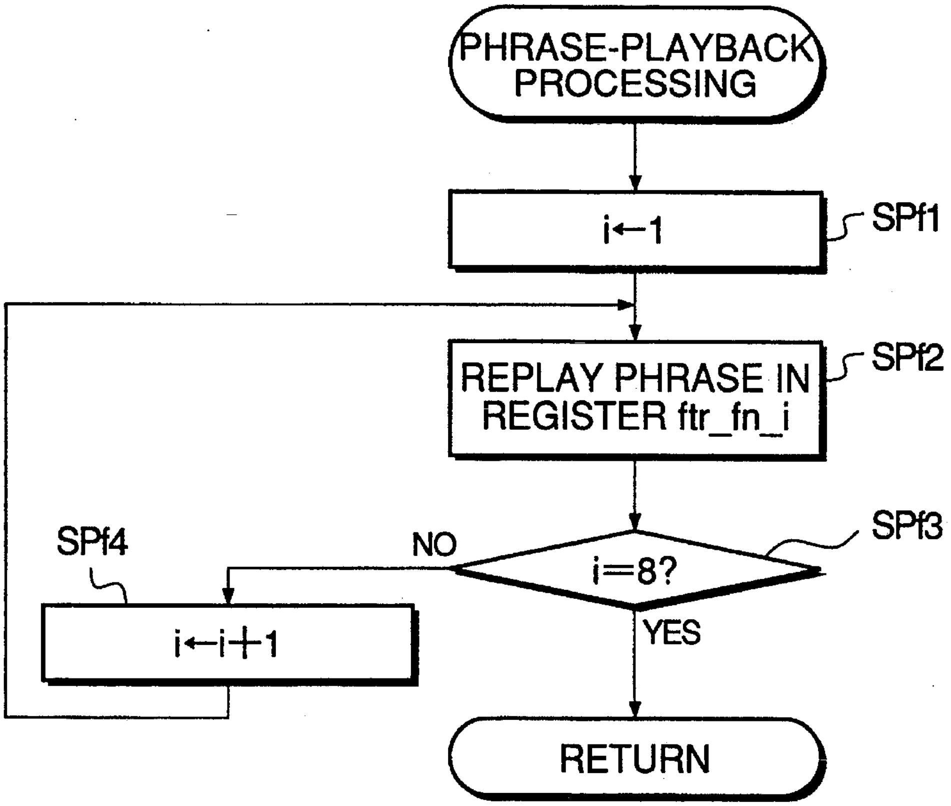
FIG. 15 is a flowchart showing details of a phrase playback processing in FIG. 12.

The phrase-playback processing will now be described with reference to FIG. 15. First, at a step SPf1, the value of the register i for counting the phrase tracks is set to "1". Then, at a step SPf2, the phrase having the phrase number stored in the register ftr_fn_i is replayed. More specifically, the phrase having the phrase number stored in the register ftr_fn_i is read out, and performance data thereof is replayed. Whenever the step SPf2 is executed by interruption, the duration of the performance data of the phrase data is decremented, and when it is reduced to "0", the next event data is processed for reproduction. The processing for generating musical tones is carried out in a similar manner to the aforedescribed single phrase-playback processing. The chord of any phrase can be different from the chord in the single pattern-playback processing (the default is C). In such a case, a similar processing to the chord processing in the single phrase-playback processing is carried out [see (a) in (2)].

Following the processing of the step SPf2, the program proceeds to a step SPf4 through a step SPf3, wherein the value of the register i is incremented by 1, and then the program returns to the step SPf2. After the steps SPf2 to SPf4 have been executed up to the phrase track 8, the answer to the question of the step SPf3 becomes affirmative ("YES"), followed by the program returning to the routine of FIG. 12.

(d) Chord Change Processing

Figure 16:
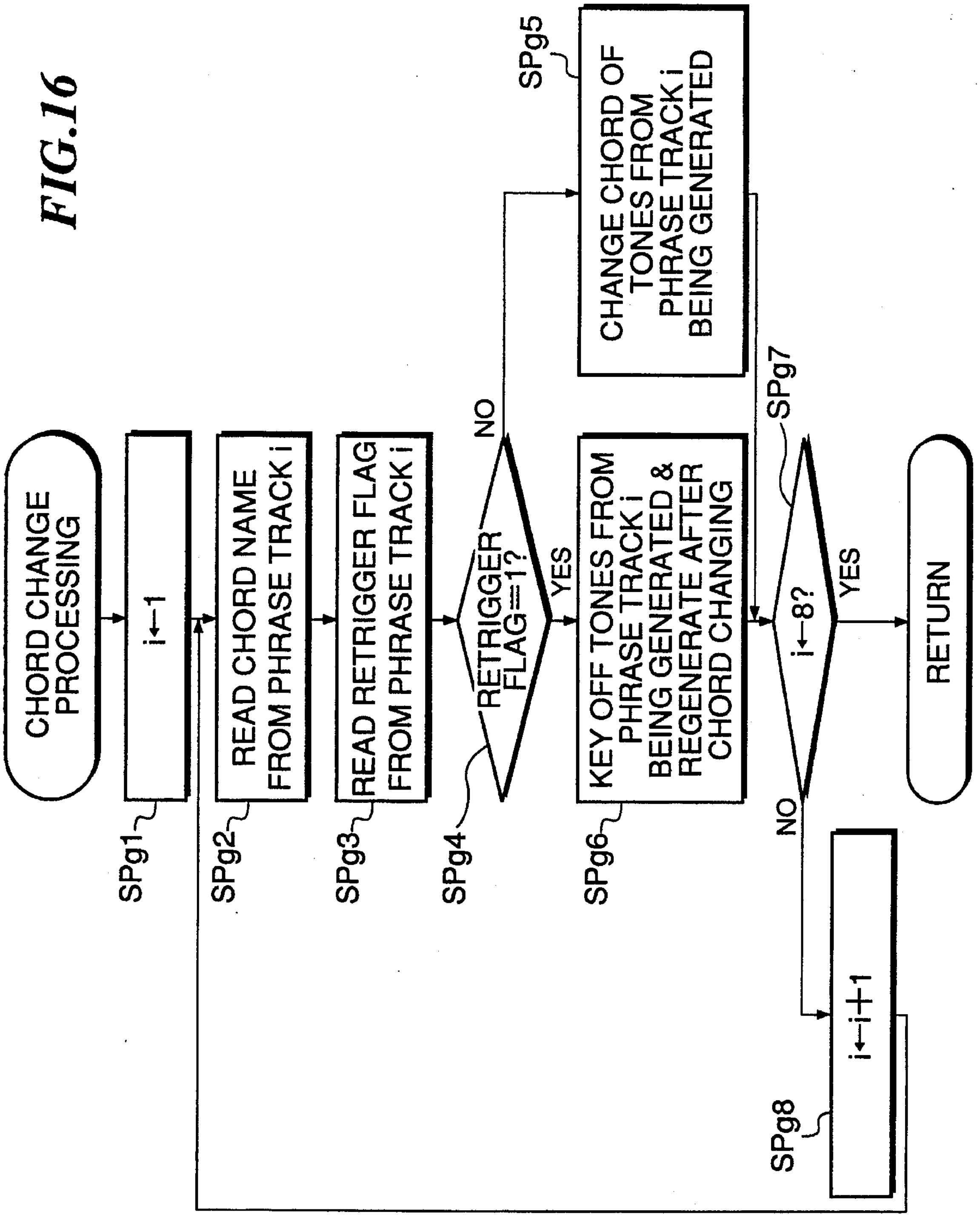
FIG. 16 is a flowchart showing details of a chord change processing in FIG. 12.

The chord change processing will now be described with reference to FIG. 16. First, at a step SPg1, the register i which counts phrase tracks is set to "1", and then at a step SPg2 a chord name (phrase chord information) of an ith phrase is read out. That is, data of the chord name of the data format of FIG. 8 is read out. This is because to effect chord change, the chord of the phrase has to be recognized so that the chord can be changed to a newly designated chord.

Then, at a step SPg3 the retrigger flag for the phrase is read out. It is determined at a step SPg4 whether or not the retrigger flag has been set to "1" at, and if it has been set to "1", the program proceeds to a step SPg6, whereas if it has been set to "0", the program proceeds to a step SPg5. At the step SPg5, if tones from the phrase track i are being generated, the chord of the tones is changed. In this case, the chord-changed tones are not regenerated, but only the note is changed. However, if the note need not be changed even with change of the chord, nothing is done and accordingly the tones before the chord change are continually generated.

At the step SPg6, if tones from the phrase track i are being generated, the tones are once keyed off and then regenerated. In this case, if the note change is necessary due to the chord change, the note is changed, whereas if the note change is not necessary, the tones before the chord change are regenerated. The chord change processing at the steps SPg5 and SPg6 is carried out in a similar manner to the chord processing in the single phrase-playback processing [see (a) in (2)]. Further, at the steps SPg5 and SPg6, if there is no tone being generated from a phrase track to be processed, nothing is done. In this case, processing for generating tones corresponding to a newly designated chord is carried out in the phrase-playback processing (step SPdS), described hereinbefore.

When the processing of the step SPg5 or SPg6 has been completed, the program proceeds through the steps spg7, SPg8 to the step SPg2 again. Thereafter, similar processings are carried out with respect to the other phrase tracks. When all the processings for the phrase tracks 1 to 8 have been completed, the answer to the question of the step SPg7 becomes affirmative ("YES"), and then the program returns to the pattern-playback processing (see FIG. 12), wherein the phrase-playback processing is executed.

Figure 17:
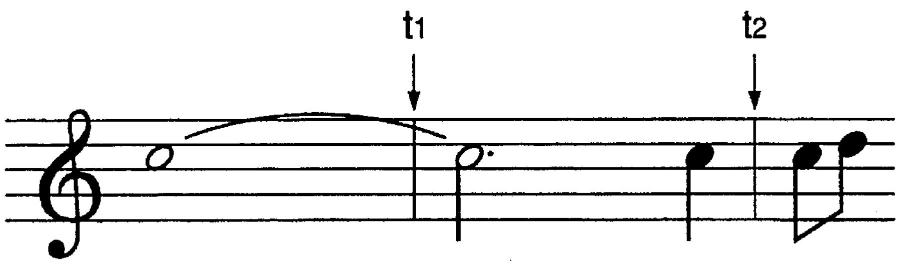
FIG. 17 shows a score having an example of phrase.

The necessity of the chord change processing described above will now briefly explained. Let it be assumed that, as shown in FIG. 17, there is a tone extending over two measures. If a chord change is effected at a time point t1 corresponding to a measure line, note change and regeneration of the tone have to be effected depending upon the chord change and the retrigger flag, respectively. However, since the length of the musical note is designated by the duration data, there is not yet the next event data at the time point t1. Therefore, in the phrase-playback processing (SPd8) which effects tone-generation and termination control based on event data, no tone is generated at the time point t1. In view of this inconvenience, according to the invention, in order to effect tone-generation control in the event that a chord change is instructed in the course of a continuous musical note, the above described chord change processing is provided. On the other hand, if a chord change is instructed at a time point t2 in FIG. 17, the chord change processing according to the invention does not function at all, but tones are appropriately generated based on event data of the musical note following the measure line, in the phrase-playback processing.

As described above, according to the embodiment, the single pattern-playback processing is carried out every interruption, and therefore the pattern-forming processing and the single pattern-playback processing are carried out on a time sharing basis and in parallel with each other. As a result, the player can ascertain by the ear a performance pattern being prepared, during preparation of the performance pattern.

By again depressing the start/stop switch SW10, termination of the automatic performance is instructed, and then the steps SPc6, SPc7, and SPc9 in FIG. 11 are executed to terminate the single pattern-playback processing.

(4) Song Mode

When the mode switch SW13 shown in FIG. 2 is depressed, the device enters the song mode, wherein the song-forming processing (the step SPb3 in FIG. 10) can be executed. This processing is carried out such that performance data are written into the song data tracks TR1–TR6 as desired by operating the keyboard 5 etc., with reference to a song-forming picture, not shown, displayed on the screen of the LCD 15, chord data are written into the chord track CTR with the progress of music, and pattern numbers are written into the pattern track PTR with the progress of music.

When the start/stop switch SW10 shown in FIG. 2 is not depressed (i.e. automatic performance is in stoppage), the answer to the question of the SPc1 of the automatic performance processing is negative ("NO"), and that of the step SPc6 is negative ("NO"), and then the program returns to the main routine, to execute the song-forming processing at the step SPb3. That is, when the start/stop switch SW10 is not depressed, the song-forming processing alone is carried out with reference to the display on the screen of the LCD 15.

On the other hand, if the start/stop switch SW10 is depressed, the program proceeds through the steps SPc1, SPc2 to the step SPc3 in FIG. 11, wherein the registers related to automatic performance, pointer, etc. are initialized to permit interruption for song mode processing. Thereafter, the program returns to the main routine via the step SPc6.

Figure 18:
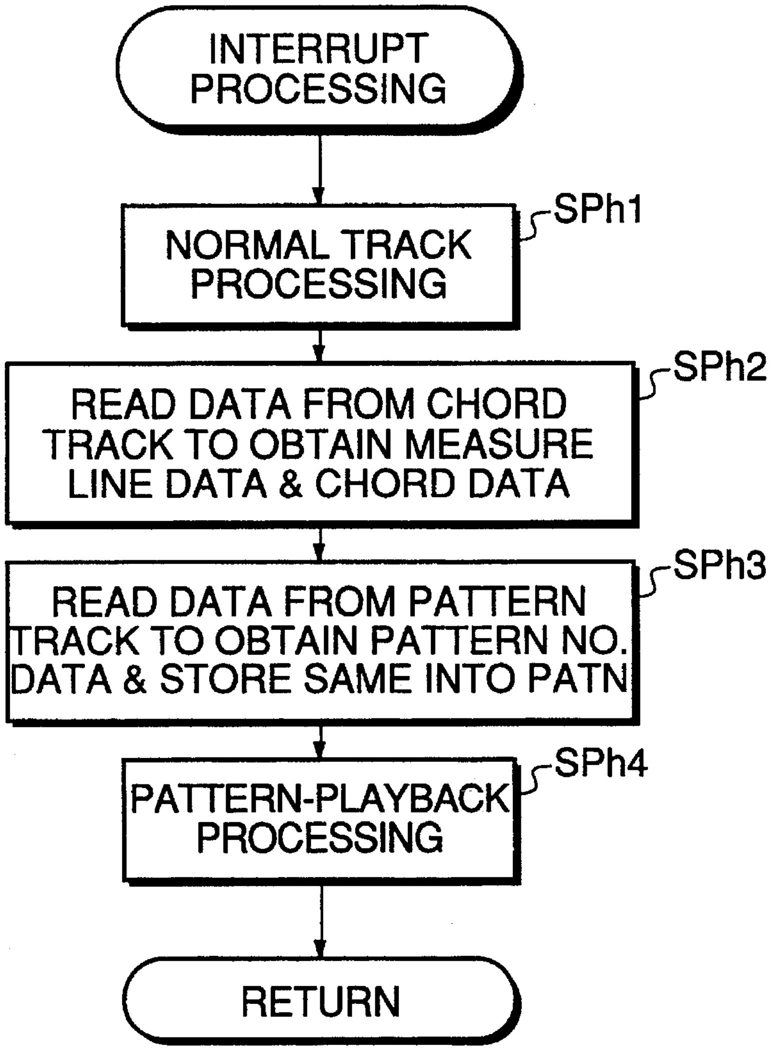
FIG. 18 is a flowchart showing an interrupt processing which is executed in song mode.

FIG. 18 shows the interrupt processing for song mode processing. First, at a step SPh1, a normal track processing is carried out based on performance data recorded on the tracks TR1–TR16 in FIG. 4. Then, at a step SPh2 data is read out from the chord track CTR according to the duration data to obtain measure line data and chord data according to the progress of music. Then, at a step SPh3 data is read out from the pattern track PTR according to the duration data to obtain a pattern number according to the progress of music. The pattern number thus obtained is stored into a register PATN.

When the processings up to the step SPh3 have been completed, the program proceeds to a step SPh4 to execute the pattern-playback processing, details of which are shown in FIG. 12. The pattern-playback processing is generally the same as that previously described with respect to the single pattern-playback processing. Therefore, the following description refers to those which are different from the aforedescribed features.

In the song mode, the steps SPd1, SPd2 are executed. The step SPd1 determines whether there has been a change of the pattern number. More specifically, it is determined whether or not the pattern number obtained at the step SPh3 in FIG. 18 is different from the immediately preceding one. If the answer is negative ("NO"), the program proceeds to the step SPd3, whereas if the answer is affirmative ("YES"), the program proceeds to the step SPd2 to reset the register barn to "1". This is because as previously mentioned, the register barn is a register for counting the number of measures to determine to which measure the performance pattern has been performed, and therefore it is necessary to reset the register barn value to "1" when a change of the pattern is effected.

Then, at the step SPd5 the measure line processing (FIG. 13) is carried out in a similar manner to that in the single pattern-playback processing, described hereinbefore. But, at the step SPe4 in FIG. 13 reference is made to the pattern number (stored in the register PATN) obtained at the step SPh3 of the interrupt processing, and to measure line data obtained at the step SPh2. This is because the automatic performance is to be given based on data from the pattern track PTR and the chord track CTR.

Also the chord change processing (FIG. 16) is carried out in a similar manner to that in the aforedescribed single pattern-playback processing. But, as the newly designated chord, the chord obtained at the step SPh2 of the interrupt processing is used instead of a chord obtained by operation by the user. The phrase-playback processing in the song mode is carried out in just the same manner as the phrase-playback processing in the aforedescribed single pattern-playback processing, but as the chord to be designated in this processing is used a chord read from the chord track CTR.

The embodiment of the invention described above provides the following results:

i) Phrases are classified according to musical instrument/performance style, beat, and section, which facilitates selecting a desired phrase.

ii) A phrase can be performed for ascertainment with any desired chord during phrase preparation and during monitoring of a preset phrase, which makes it possible to ascertain a phrase with a chord used in the music. Therefore, phrases can be prepared or preset phrases can be selected while imagining an actual music to be obtained by the prepared and/or selected phrases.

iii) Even if phrases have respective different lengths, the phrase length can be adjusted to a length such that generation of the phrase does not interfere with that of the following phrase, to thereby enable preparation of a performance pattern from a combination of phrases without worrying about the lengths of phrases.

iv) The user can prepare phrases, whereby he can utilize the automatic performance device according to the invention, in a similar manner to the conventional automatic performance device. Further, in this connection the user can input performance data with a desired chord.

v) In the phrase mode, automatic performance can be given by designating a preset phrase or a user phrase as desired, and therefore the user can ascertain phrases constituting a performance pattern by the ear.

Many variations can be made to the above described embodiment of the invention. For example, performance information may be input by other operating elements than the keyboard. Further, the phrase-forming picture is not limited to the one shown in FIG. 3, but a staff may be displayed, in which input notes may be sequentially displayed.

What is claimed is:

1. An automatic performance device comprising:

a performance phrase memory for storing a plurality of performance phrases each identified by a phrase identifier;

performance pattern-forming means, operable by an operator, for preparing a performance pattern by forming a sequence of at least one phrase identifier;

a performance pattern memory for storing a plurality of said performance patterns;

pattern designating means for designating at least one of said plurality of performance patterns stored in said performance pattern memory;

pattern reading means for reading from said performance pattern memory the sequence of phrase identifiers corresponding to said at least one performance pattern designated by said designating means;

phrase reading means for reading from said performance phrase memory the performance phrases corresponding to said phrase identifiers read by said pattern reading means; and performance means for performing said performance phrases read by said phrase reading means.

2. An automatic performance device as claimed in claim 1 further comprising:

playback chord-designating means for designating a chord of at least one of said performance phrases read by said phrase reading means, and changing means for changing a note of said at least one of said performance phrases read by said phrase reading means according to said chord designated by said playback chord-designating means.

3. An automatic performance device as claimed in claim 2, wherein said plurality of performance phrases stored in said performance phrase memory each include phrase chord information and said changing means changes said note of said at least one of said performance phrases read by said phrase reading means according to correspondence between said phrase chord information and said chord designated by said playback chord-designating means.

4. An automatic performance device as claimed in claim 3, wherein said changing means comprises:

first change means for changing said note of said at least one of said performance phrases read by said phrase reading means based on said phrase chord information to an intermediate note based on a predetermined reference chord, and second change means for changing said intermediate note to a final note based on said chord designated by said playback chord-designating means.

5. An automatic performance device as claimed in claim 1, wherein said plurality of performance patterns stored in said performance pattern memory each include a plurality of sequences of phrase identifiers each corresponding to one of a plurality of musical parts.

6. An automatic performance device as claimed in claim 1, wherein said plurality of performance patterns stored in said performance pattern memory each include tone color-designation information indicative of a tone color to be set in performance of each said performance pattern, said performance means performing said performance phrases read by said phrase reading means according to tone color-designation information included in said performance pattern.

7. An automatic performance device as claimed in claim 1, wherein said plurality of performance phrases stored in said performance phrase memory each include tone color-designation information indicative of a tone color to be set in performance of each said performance phrase, said performance means performing said performance phrases read by said phrase reading means according to tone color-designation information included in said read performance phrases.

8. An automatic performance device as claimed in claim 7, wherein each of said plurality of performance patterns stored in said performance pattern memory includes second tone color designation information indicative of whether a tone color to be set in performance of the performance phrases identified by the phrase identifiers of said performance pattern should be a tone color preset and stored for said each of said plurality of performance phrases or should be another particular tone color, said performance means said performing means performing said performance phrases read by said phrase reading means based on said tone color preset and stored therefor when said second tone color designation information indicates said preset and stored tone color, and performing said performance phrases read by said phrase reading means based on said other particular tone color when said second tone color designation information indicates said other particular tone color.

9. An automatic performance device as claimed in claim 1, wherein each said performance pattern stored in said performance pattern memory further comprises a plurality of areas corresponding, respectively, to a plurality of measures, and wherein said plurality of phrase identifiers are stored in said plurality of storage areas in said sequence in which said plurality of performance phrases are to be performed.

10. An automatic performance device as claimed in claim 1, wherein each of said plurality of performance phrases stored in said performance phrase memory include at least one of musical instrument data and performance style data.

11. An automatic performance device as claimed in claim 1, wherein each of said plurality of performance phrases stored in said performance phrase memory include beat data.

12. An automatic performance device as claimed in claim 1, wherein each of said plurality of performance phrases stored in said performance phrase memory include information for specifying at least introduction performance, main performance, fill-in performance and ending performance of said performance phrase.

13. An automatic performance device as claimed in claim 1 further comprising:

a song memory for storing a sequence of pattern identifiers each identifying one of said performance patterns stored in said performance pattern memory, and song reading means for reading out said sequence of pattern identifiers from said song memory.

14. An automatic performance device as claimed in claim 1, wherein said plurality of performance phrases stored in said performance phrase memory include data input by said operator.

15. An automatic performance device comprising:

mode selecting means for selecting an input mode and a playback mode;

input means operable when said input mode is selected, for inputting performance information by operation of an operator;

first chord-designating means for designating a chord name corresponding to said performance information input by said input means;

performance information memory;

writing means for writing into said performance information memory said performance information input by said input means and said chord name designated by said first chord-designating means;

second chord-designating means operable when said playback mode is selected, for designating a chord name to be set in reproduction of said performance information;

performance means for reading out said performance information and said chord name from said performance information memory, changing said performance information based on the read-out chord name to performance information based on a predetermined reference chord, and then changing said performance information based on said predetermined reference chord to performance information based on said chord name designated by said second chord-designating means, and for giving automatic performance based on said performance information based on said chord name designated by said second chord-designating means; and audition means for ascertaining said performance information based on said chord name designated by said second chord-designating means, by changing said performance information based on said read-out chord name designated by said first chord-designating means to performance information based on a predetermined reference chord, then changing said performance information based on said predetermined reference chord to performance information based on said chord name designated by said second chord-designating means, and giving automatic performance based on said performance information based on said chord name designated by said second chord-designating means.

* * * * *